United States Patent [19]
Shimada

[11] Patent Number: 5,993,125
[45] Date of Patent: Nov. 30, 1999

[54] ELECTRODE TIP DRESSER

[76] Inventor: Toshiaki Shimada, 2-41-2 Kawauchi Asaminami, Hiroshima, Japan

[21] Appl. No.: 09/103,103

[22] Filed: Jun. 23, 1998

[30] Foreign Application Priority Data

Jun. 27, 1997 [JP] Japan .................................. 9-187872

[51] Int. Cl.$^6$ .............................. B23C 3/12; B23K 11/30
[52] U.S. Cl. ............................................ 409/140; 409/181
[58] Field of Search ..................................... 409/140, 175, 409/181; 219/119, 69.11, 69.15, 69.17

[56] References Cited

U.S. PATENT DOCUMENTS

| 4,842,456 | 6/1989 | Saito ................................. 409/140 X |
| 4,849,599 | 7/1989 | Kuromatsu ........................... 219/69.17 |
| 5,401,127 | 3/1995 | Nakajima et al. .................. 409/181 X |

FOREIGN PATENT DOCUMENTS 273679 11/1989 Japan ..................................... 409/140

*Primary Examiner*—William Briggs
*Attorney, Agent, or Firm*—Jordan and Hamburg LLP

[57] ABSTRACT

The present invention provides a tip dresser for cutting and repairing spot welding electrode tips of a pair of electrodes. The tip dresser includes a rotative member having opposite sides and rotatable around centerline of M—M passing through the opposite sides by a driving means, and cutters respectively provided on the opposite sides of the rotative member for cutting edge surfaces of the electrode tips. The cutters are electrically isolated from one another.

6 Claims, 2 Drawing Sheets

5,993,125

ELECTRODE TIP DRESSER

BACKGROUND OF THE INVENTION

1. Field of the Invention

The present invention relates to a tip dresser for cutting and repairing spot welding electrode tips of a pair of electrodes by oppositely positioning the electrodes with the tip dresser therebetween at the time of that the electrode tips have been worn out or damaged.

2. Discussion of the Background

A tip dresser is used to repair electrode tips respectively provided on tip portions of bodies of a pair of spot welding electrodes by oppositely positioning the electrodes with the tip dresser therebetween, rotating cutters of the tip dresser and cutting an edge surface of the electrode tip of each electrode to a proper shape at the time of that the electrode tips have been worn out our damaged. The tip dresser of a conventional type is however made of electrically conductive material. This requires shutting off of electric current of a welding machine to prevent the current from flowing from one electrode to the opposite electrode prior to abutting the electrode tips against the cutters of the tip dresser and cutting the edge surfaces of the electrode tips.

However, the shutting off of the current needs to be carried out in each cutting operation carried out by the tip dresser of the conventional type. This is troublesome and therefore degrades working efficiency.

It is an object of the present invention to provide a tip dresser which is capable of cutting edge surfaces of the electrode tips of a pair of the electrodes oppositely positioned with the tip dresser therebetween, as the electric current continuously flows through the welding machine.

SUMMARY OF THE INVENTION

According to one aspect of the present invention, there is provided a tip dresser for cutting and repairing spot welding electrode tips of a pair of electrodes which includes a rotative member having opposite sides and rotatable around centerline of M—M passing through the opposite sides by a driving means, and cutters respectively provided on the opposite sides of the rotative member for cutting edge surfaces of the electrode tips, in which the cutters are electrically isolated from one another.

The above arrangement enables the tip dresser to cut the edge surfaces of the electrode tips of a pair of the electrodes as the electric currents continuously flow through a welding machine.

The rotative member is preferably made of insulating material to achieve the above effect.

The rotative member and the cutters preferably and respectively define through-holes, through which cut powder generated in cutting operation is expelled to the outside of the tip dresser. With this arrangement, cut powder can be smoothly expelled from the tip dresser so as not to damage the cutters with cut powder in cutting operation.

According to another aspect of the invention, there is provided a tip dresser for cutting and repairing spot welding electrode tips of a pair of electrodes which includes a rotative member having opposite sides and rotatable around centerline of M—M passing through the opposite sides by a driving means, cutters for cutting edge surfaces of the electrode tips of a pair of the electrode, the cutters each including a base plate having a first surface and a second surface, a plurality of protrusions provided on the first surface of the base plate extending radially from the centerline of M—M, a plurality of the protrusions on each of the base plates each defining a tapered portion for abutting against an edge surface of the electrode tip, in which the cutters are respectively secured via the second surfaces of the base plates to the opposite sides of the rotative member in such a manner as to be electrically isolated from one another.

BRIEF DESCRIPTION OF THE DRAWINGS

The above, and other objects, features and advantages of the present invention will become apparent from the detailed description thereof in conjunction with the accompanying drawings wherein.

DETAILED DESCRIPTION OF THE PREFERRED EMBODIMENT

Embodiment 1

Figure 1:
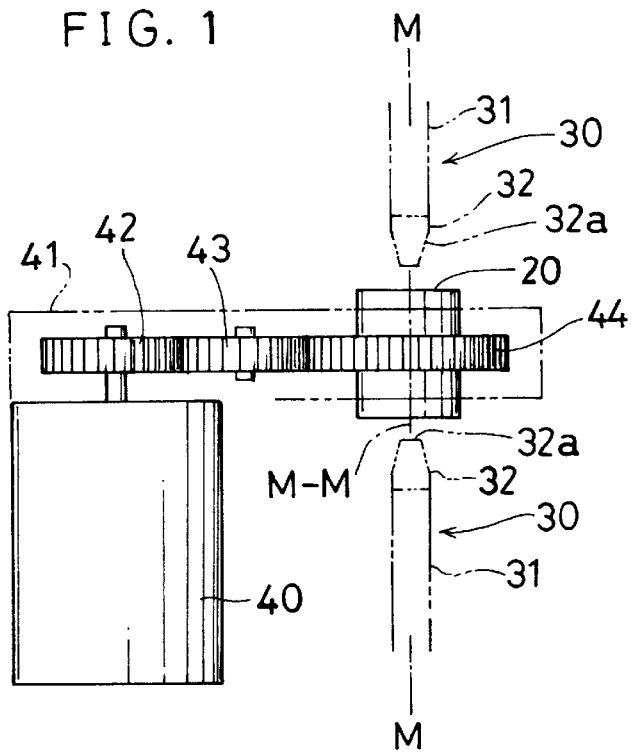
FIG. 1 is a schematic front view illustrating a welding machine with a tip dresser mounted thereon.

Referring to FIG. 1, a motor 40 as a driving means is mounted on a motor case (not shown) which is integrally made with a frame 41. A driving gear 42 secured to a motor shaft is meshed with an intermediate gear 43. A passive gear 44 is provided on a peripheral surface of a rotative member 20 made of insulating material, and meshed with the intermediate gear 43. The rotative member 20 has a rounded shape with two opposite sides. The insulating material in this embodiment is preferably a synthetic resin. The passive gear 44 is made of the same material as that of the rotative member 20 to be integrally formed with the rotative member 20 in this embodiment. However, the passive gear 44 may be made of a different material and separately provided on the rotative member 20.

Figure 2:
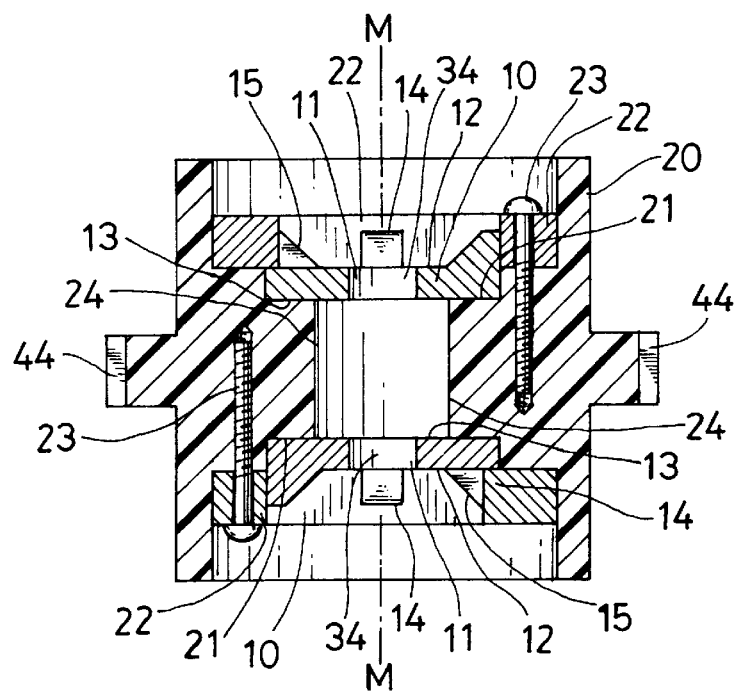
FIG. 2 is a cross sectional view illustrating the tip dresser of FIG. 1.
Figure 3:
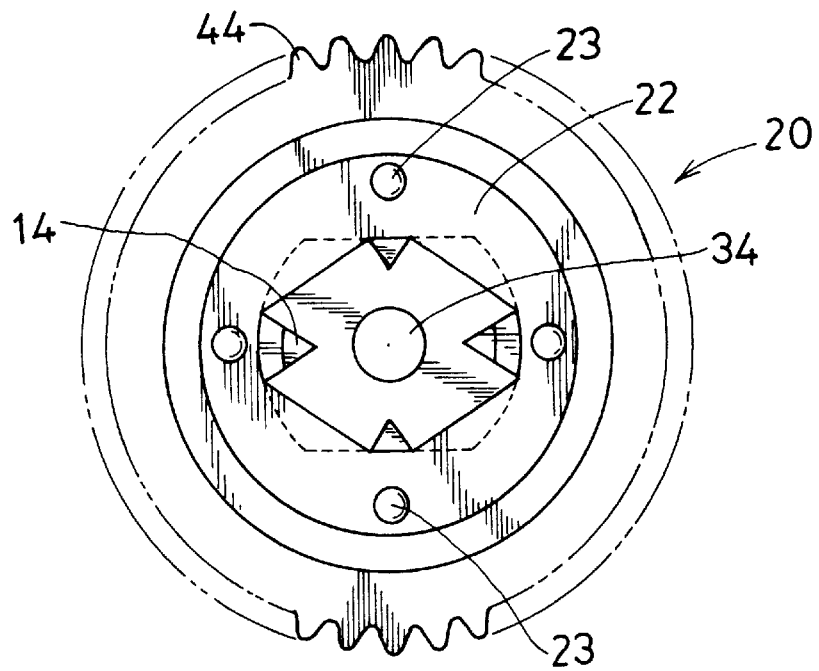
FIG. 3 is a plan view of the tip dresser of FIG. 1.
Figure 4:
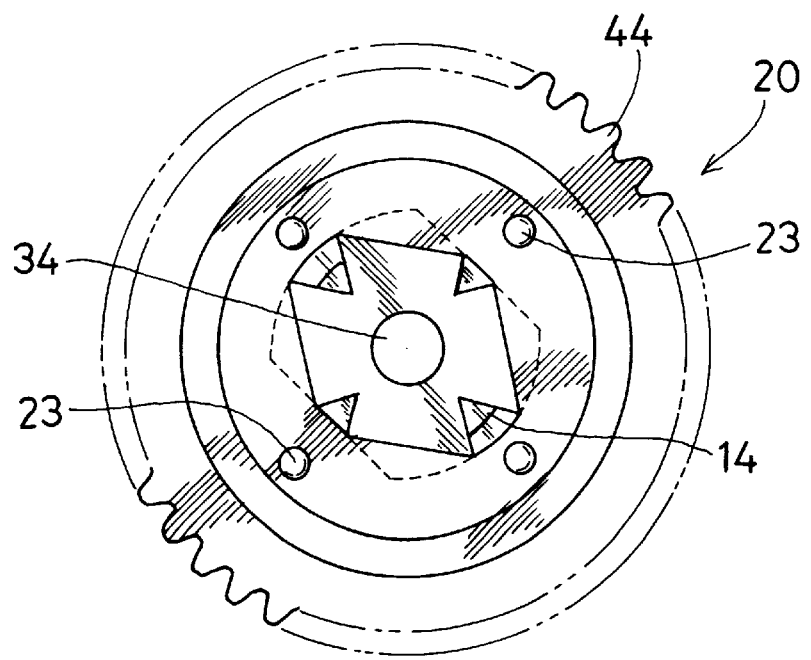
FIG. 4 is a bottom plan view illustrating the tip dresser of FIG. 1.

Referring to FIG. 2, the passive gear 44 is rotatable around the centerline of M—M passing through the two opposite sides of the rotative member 20. On the two opposite sides of the rotative member 20 are respectively defined recesses 21, to which a pair of cutters 10 are secured to be rotatable integrally with the rotative member 20. The cutters 10 each includes a base plate 11 having a first surface 12 and a second surface 13, a plurality of protrusions 14 provided on the first surface 12 of the base plate 11 in such a manner as to extend radially from the centerline of M—M.

The protrusions 14 on the first surface 12 each defines a tapered portion 15 for abutting against an edge surface of an electrode tip 32 provided on a tip portion of a body 31 of a spot welding electrode 30 to be cut and repaired. The tapered portions 15 each has such a shape as to enable the cutters 10 to cut the tip to a predetermined shape proper for a further use of the electrode tip. The thus arranged cutters 10 are respectively secured to the opposite sides of the rotative member 20 via the second surfaces 13 of the cutters 10 in such a manner as to be electrically isolated from one another.

The base plate 11 of each cutter 10 which has been fitted into the corresponding recess 21 of the rotative member 20 is secured in position by applying a pressure member 22 on the portion of the base plate 11 other than the protrusions 14 and tightening them together via screws 23. The screws 23 extend to the rotative member 20, not protruding from the opposite side thereof, and arranged so that the screws 23 screwed from the both sides of the rotative member 20 do not abut against each other.

Both recesses 21 are communicated with one another via a through-hole 24 defined in the rotative member 20, and the base plates 11 of the cutters 10 each defines a through-hole 34, so that the through-holes 24 and 34 are coaxially aligned in a parallel relationship with the centerline of M—M.

The operational step to cut and repair the electrode tip 32 of the electrode 30 by the tip dresser of the above arrangements will be hereinafter discussed.

Driving the motor 40 causes rotational torque to be transmitted to the rotative member 20 via the driving gear 42, the intermediate gear 43 and the passive gear 44. The cutters 10 provided on the opposite sides of the rotative member 20 are then integrally rotated with the rotative member 20.

The electrodes 30 are then positioned to the opposite sides of the rotative member 20 in such a manner as to bring the edge surfaces 32a of the corresponding tips 32 into abutting relationship with the tapered portions 15 of the protrusions 14 on the corresponding cutters 10. The edge surfaces 32a of the electrode tips 32 are thus cut by the cutters 10 into a predetermined shape proper for a further use of the electrode tip 32. In this operation, it is not necessary to shut off the current flowing through a welding machine, since the rotative member 20 of insulating material is interrupted between the opposite electrodes 30.

Cut powder of the electrode tip 32 generated in cutting operation of the electrode 30 positioned above the tip dresser is dropped downwardly via the through-holes 24 and 34 and expelled to the outside of the tip dresser.

This specification is by no means intended to restrict the present invention to the preferred embodiments set forth therein. Various modifications to the tip dresser for cutting and repairing spot welding electrode tips of the present invention, as described herein, may be made by those skilled in the art without departing from the spirit and scope of the present invention as defined in the appended claims.

What is claimed is:

1. A tip dresser for cutting and repairing spot welding electrode tips of a pair of electrodes comprising a rotative member having opposite sides and rotatable around centerline of M—M passing through the opposite sides by a driving means; and cutters respectively provided on the opposite sides of the rotative member for cutting edge surfaces of the electrode tips, in which the cutters are electrically isolated from one another.

2. A tip dresser as set forth in claim 1, wherein said rotative member is made of insulating material.

3. A tip dresser as set forth in claim 1, wherein the rotative member and the cutters respectively define through-holes, through which cut powder generated in cutting operation is expelled to the outside of the tip dresser.

4. A tip dresser for cutting and repairing spot welding electrode tips of a pair of electrodes comprising a rotative member having opposite sides and rotatable around centerline of M—M passing through the opposite sides by a driving means; cutters for cutting edge surfaces of the electrode tips of a pair of the electrode; the cutters each including a base plate having a first surface and a second surface; a plurality of protrusions provided on the first surface of each of the base plates extending radially from the centerline of M—M, said a plurality of the protrusions on each of the base plates each defining a tapered portion for abutting against an edge surface of the electrode tip, in which the cutters are respectively secured via the second surfaces of the base plates to the opposite sides of the rotative member in such a manner as to be electrically isolated from one another.

5. A tip dresser as set forth in claim 4, wherein the rotative member is made of insulating material.

6. A tip dresser as set forth in claim 4, wherein the rotative member defines a through-hole, and the cutters on the opposite sides of the rotative member respectively defines through-holes in such a manner as to be aligned with the through-hole of the rotative member.

\* \* \* \* \*